(12) United States Patent
Harrison et al.

(10) Patent No.: US 8,663,465 B2
(45) Date of Patent: Mar. 4, 2014

(54) CONTINUOUSLY SUPPLIED WATER FILTRATION BANKS

(75) Inventors: Jane Harrison, Princeton, NJ (US);
David Turnbull, Princeton, NJ (US);
Wole Soboyejo, Skillman, NJ (US)

(73) Assignee: ATOPIA Research, Princeton, NJ (US)

( * ) Notice: Subject to any disclaimer, the term of this patent is extended or adjusted under 35 U.S.C. 154(b) by 324 days.

(21) Appl. No.: 13/176,489

(22) Filed: Jul. 5, 2011

(65) Prior Publication Data
US 2012/0006738 A1    Jan. 12, 2012

Related U.S. Application Data (60) Provisional application No. 61/362,216, filed on Jul. 7, 2010.

(51) Int. Cl.
*C02F 1/00* (2006.01)

(52) U.S. Cl.
USPC ..... 210/153; 210/172.1; 210/253; 210/257.1; 210/258; 210/262; 210/322; 210/416.3; 210/474; 210/489; 210/510.1

(58) Field of Classification Search
USPC ............... 210/153, 172.1, 253, 255, 257.1, 210/258–260, 262, 322, 416.3, 474, 489, 210/510.1; 52/12
See application file for complete search history.

(56) References Cited

U.S. PATENT DOCUMENTS

| | | | |
|---|---|---|---|
| 1,135,753 A * | 4/1915 | Baldwin | 210/292 |
| 4,032,439 A | 6/1977 | Oldham | |
| 5,064,308 A | 11/1991 | Almond et al. | |
| 5,848,856 A | 12/1998 | Bohnhoff | |
| 6,398,455 B1 | 6/2002 | Volstad | |
| 6,436,283 B1 | 8/2002 | Duke | |
| 7,025,887 B1 | 4/2006 | Kirts et al. | |
| 7,491,330 B2 | 2/2009 | Harvey | |
| 2001/0030161 A1 | 10/2001 | Hosoya | |

(Continued)

FOREIGN PATENT DOCUMENTS

| WO | WO 2005/100786 A1 | 10/2005 |
|---|---|---|
| WO | WO 2010/037005 A2 | 4/2010 |

OTHER PUBLICATIONS

Pitch_Africa: a project by ATOPIA Research, Sep. 2008, ATOPIA_Research Inc., Princeton, New Jersey. (Three (3) pages).

(Continued)

*Primary Examiner* — Matthew O Savage
(74) *Attorney, Agent, or Firm* — Crowell & Moring LLP (57) ABSTRACT

A filtration and dispensing system that is particularly suitable for underdeveloped parts of the world is provided for storing, filtering, and dispensing rainwater, surface water, or groundwater. The system includes a bank of ceramic filters, a water retention container for holding water to be dispensed by the system, and at least one header tank to which water supplied from the water retention container is fed. A pump is utilized to withdraw water from a lower portion of the water retention container and supplied to the header tank. The withdrawn water is distributed by way of piping from the header tank to individual ceramic filters in the bank of ceramic filters, and a collection tank receives filtered water discharged from the bank of ceramic filters. Trickle feed nozzles or other discharge elements are used to discharge the filtered water from the collection tank for use.

20 Claims, 8 Drawing Sheets

(56) References Cited

U.S. PATENT DOCUMENTS

2008/0073263 A1 3/2008 Yamaguchi
2008/0169258 A1 7/2008 Weisbauer
2008/0272064 A1 11/2008 Leonard
2009/0128085 A1 5/2009 Yang

OTHER PUBLICATIONS

Pitch_Africa Log 2.1, Cistern_X, Jan.-Jun. 2009, ATOPIA_Research Inc., Princeton, New Jersey. (Four (4) pages).
"Catch the Rain so it Falls Forever", Pitch_Africa Log 2.2, Cisterns That Do Other Things, Jan.-Jun. 2009, ATOPIA_Research Inc., Princeton, New Jersey. (Six (6) pages).
Pitch_Africa Log 2.3, Street Soccer Venue, Jan.-Jun. 2009, ATOPIA_Research Inc., Princeton, New Jersey. (Seven (7) pages).
Pitch_Africa Log 3, 3.2 Special Containers, Apr.-Jun., ATOPIA_Research Inc., Princeton, New Jersey. (Three (3) pages).
Pitch_Africa Log 3, 3.2 Furniture, Apr.-Jun., ATOPIA_Research Inc., Princeton, New Jersey. (Five (5) pages).
Pitch_USA Log 1: a project by ATOPIA Research, Introduction, Oct. 2009, ATOPIA_Research Inc, Princeton, New Jersey. (Five (5) pages).
International Preliminary Report on Patentability dated Jan. 8, 2013 (two (2) pages).
Kelly Thesier, "Target Field Water Recycling Unique: Pentair System Should Reduce Needs by 50 Percent", MLB.com, Jan. 12, 2010 [online], [Retrieved on Nov. 16, 2011], URL http://Minnesota.twins.mlb.com/news/print.jsp, (One (1) page).
PCT/ISA/237 Form (Four (4) pages).
International Search Report dated Nov. 30, 2011 (Four (4) pages).
Corresponding International Search Report with English Translation dated Dec. 13, 2011 ( two (2) pages).
Form PCT/ISA/237 (four (4) pages).
Princeton, "Wind Energy and Rainwater Harvesting Technologies for Post-Disaster Relief and Recovery", Princeton University, Apr. 2010, pp. 9-11, published at http://commons.princeton.edu/kellercenter/docs/Wind-Energy-Haiti-Project-2010.pdf.
Hilary Parker, "Researchers Develop Relief Technologies for Haiti", Princeton University Bulletin, May 24, 2010, p. 8, vol. 99, No. 14, published at http://www.princeton.edu/main/news/bulletin/docs/Bulletin-2010-05-24.pdf.
International Search Report dated Nov. 16, 2011 (Three (3) pages).

* cited by examiner

CONTINUOUSLY SUPPLIED WATER FILTRATION BANKS

This application claims priority under 35 U.S.C. §119(e) to U.S. provisional application Ser. No. 61/362,216, filed Jul. 7, 2010, the entire disclosure of which is incorporated by this reference into the present application.

BACKGROUND OF THE INVENTION

1. Field of the Invention

This invention generally relates to both water harvesting systems and to the scaling up of continuously supplied clay water filtration systems, and involves integrating a ceramic water filtration arrangement with water storage systems supplied with rainwater, surface water, and/or groundwater.

2. Description of Related Art

Water harvesting systems are used worldwide. Gray water systems, for example, capture run off from gutters and the like. Some systems rely on placing barrels or other containers in the open to capture rainwater.

Various documents presently exist that describe arrangements relating to rainwater collection. The ATOPIA RESEARCH Inc. document titled *Pitch Africa: A Project by ATOPIA Research* (September 2008), for example, discloses a network of artificial watersheds and aquifers and mentions the use of four different scales of rainwater capturing devices, including a small single container cistern, a larger two container cistern, a matrix of containers under a street soccer tournament venue, and a full rainwater harvesting soccer field.

The ATOPIA RESEARCH Inc. document titled *PITCH_AFRICA LOG 2.1, CISTERN_X* (January-June 2009) describes a single twenty foot long shipping container, a lightweight hinged frame to form a rainwater harvesting hood, and a textile envelope.

The ATOPIA RESEARCH Inc. document titled *PITCH_AFRICA LOG 2.2, CISTERNS THAT DO OTHER THINGS* (January-June 2009) describes two twenty foot long shipping containers that combine to store a minimum of 60,000 liters of water annually.

The ATOPIA RESEARCH Inc. document titled *PITCH_AFRICA LOG 2.3, STREET SOCCER VENUE* (January-June 2009) describes an arrangement for using the single container cistern (Log 2.1), the two-container cistern (Log 2.2), and a matrix of containers under a street soccer tournament venue and a full size soccer field.

The ATOPIA RESEARCH Inc. document titled *PITCH_AFRICA LOG 3, 3.2 SPECIAL CONTAINERS* (April-June) describes various types of specially fitted out shipping containers that make possible the provision of services in areas without basic amenities.

The ATOPIA RESEARCH Inc. document titled *PITCH_AFRICA LOG 3, 3.2 FURNITURE* (April-June) describes a modular system of tables and stools using components with certain geometric configurations.

Clay water filters were first introduced in 1827 by a London pottery merchant and popularized in 1835, when Queen Victoria commissioned production of water purifiers with clay filter elements for bacterial removal for the Royal household following Prince Albert's death from typhoid. In the 1980s, USAID and the IADB, in order to provide appropriate technology for developing nations, financed a factory in Ecuador to produce filters, although the project was abandoned due to insufficient demand. The Potters for Peace organization, collaborating with the WHO, has popularized further development of this technology, and has encouraged access to this technology through an Open Source Manufacturing model. Clay water filter (CWF) technology has been cited by the United Nations' Appropriate Technology Handbook, and hundreds of thousands of filters have been distributed worldwide by organizations such as the International Federation of the Red Cross and Red Crescent, Doctors Without Borders, UNICEF, Plan International, Project Concern International, Oxfam, and USAID. Scientists at MIT, Harvard, Yale, Princeton, Tulane, the University of Colorado, and the University of North Carolina have also tested CWF technology.

Clay (or ceramic) water filtration is now used in many parts of the developing world to filter water. Fabrication of clay water filters involves mixing clay and sawdust in certain proportions and forming the mixture into the shape of pot using a press or a potter's wheel or by hand molding. When the pot is fired, the sawdust disintegrates, leaving pores within the clay. The pot is dipped in a solution of colloidal silver that controls the growth of bacteria within the pores. When water is filtered through these pots, bacteria and pathogens, including *E. coli*, are trapped within the pores and removed from the water. The filtration capacity of these pots, however, has been limited by the strength of the clay and by the water pressure on that clay when the pot is filled and filtering. This has meant that these filters work as individual filters and are limited in filtering capacity to about 30 liters per day.

SUMMARY OF THE INVENTION

One aspect of the present invention concerns a way of providing a unit that incorporates multiple pot filters such that much larger quantities of water can be filtered on a daily basis by way of a continuously supplied clay water filtration bank. In one preferred configuration, such filters are used in conjunction with a water harvesting system having a water retention container and a lightweight water collection hood. The collection hood includes a frame, a flexible material supported by the frame and forming an opening, and a water permeable material covering the opening. The frame and the flexible and water permeable materials combine to form a water catchment arrangement configured to allow water to pass into a container while preventing mosquitoes and undesirable contaminants from entering the container.

Preferably, the water catchment and the water storage device are linked to a filtration unit having a collection of ceramic filters, a header tank, and a receiving tank. Water, including a mix of rainwater, ground water, and surface water, can be collectively stored in a cistern or reservoir. The stored water is pumped into a header tank, possibly using a solar powered pump, and then fed through an array of 30 liter capacity ceramic water filters into a receiving tank, providing a supply of safe drinking water. The storage capacity of the cistern or reservoir can be tailored to suit specific geographic regions and water availability to mitigate the effects of short rainy seasons and long droughts.

The water retention reservoir or container may be formed by a used shipping container or multiple used shipping containers. The water harvesting system can include a substantial water collecting surface area and one or more water retention containers. The container is preferably lined with a bladder that actually holds the water, with the container providing the rigid structure that supports the bladder. This allows for the reuse of end of life cargo containers that are damaged or punctured. The water harvesting or collection system is positioned above the container and feeds water into the bladder. The structure of the water collection system preferably extends outwardly beyond the opening to the container to increase the surface area that captures rain. The collection system optionally includes a cover that allows water to pass through but restricts the ability of mosquitoes, contaminants, dust and dirt, and so on to enter the water collection system.

In a particularly suitable embodiment of the invention, a filtration and dispensing system for storing, filtering, and dispensing rainwater, surface water, or groundwater, includes a bank of ceramic filters, a water retention container for holding water to be dispensed by the system, and at least one header tank to which water supplied from the water retention container is fed. A pump is utilized to withdraw water from a lower portion of the water retention container and supplied to the header tank. The withdrawn water is distributed by way of piping from the header tank to individual ceramic filters in the bank of ceramic filters, and a collection tank receives filtered water discharged from the bank of ceramic filters. Trickle feed nozzles or other discharge elements are used to discharge the filtered water from the collection tank for use.

In a preferred arrangement, the system includes a battery array for supplying power to the pump. A solar cell arrangement may be utilized to charge batteries in such an array. The system can further include a catchment arrangement overlying an open top of the collection tank to pre-filter water entering the collection tank. In the particular arrangement described, this catchment arrangement includes a thermoplastic polymer coarse filtering layer, a fine filtering layer of netting or similar material, and a grating or frame providing a support layer. Polypropylene is one preferred thermoplastic polymer material usable as the coarse filtering layer.

In one comprehensive configuration, the filtration and dispensing system mentioned is used in conjunction a portable fabric enclosure having a surface configured to direct water incident thereon toward a central opening disposed over the water retention container to provide an overall water collection, filtration, and distribution arrangement.

DETAILED DESCRIPTION OF THE INVENTION

Figure 1:
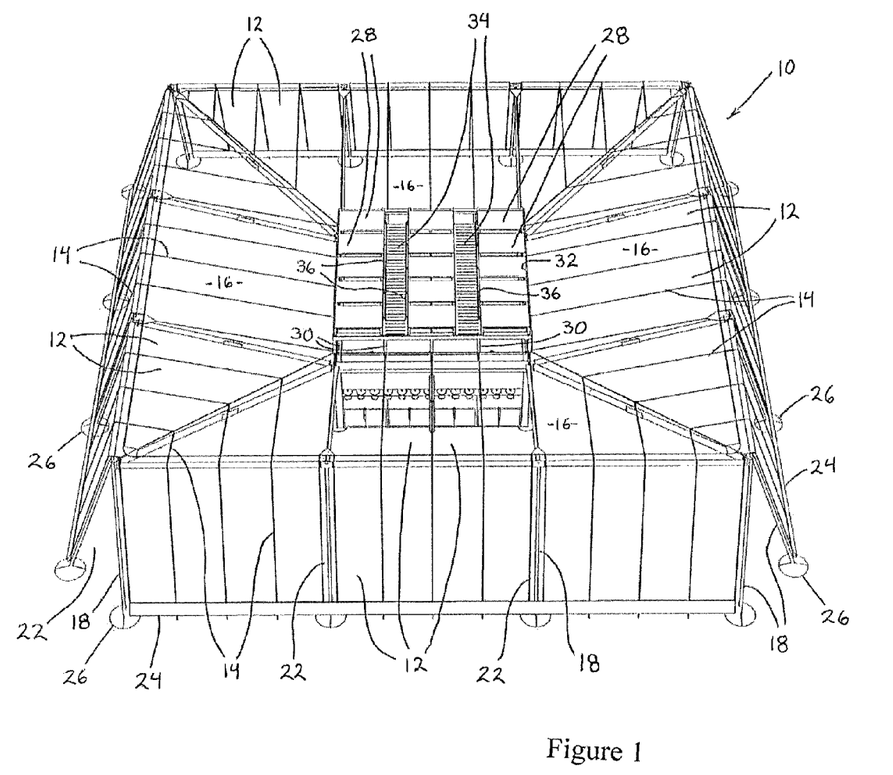
FIG. 1 is a view from above an overall water collection, filtration, and distribution arrangement according to the invention.
Figure 3:
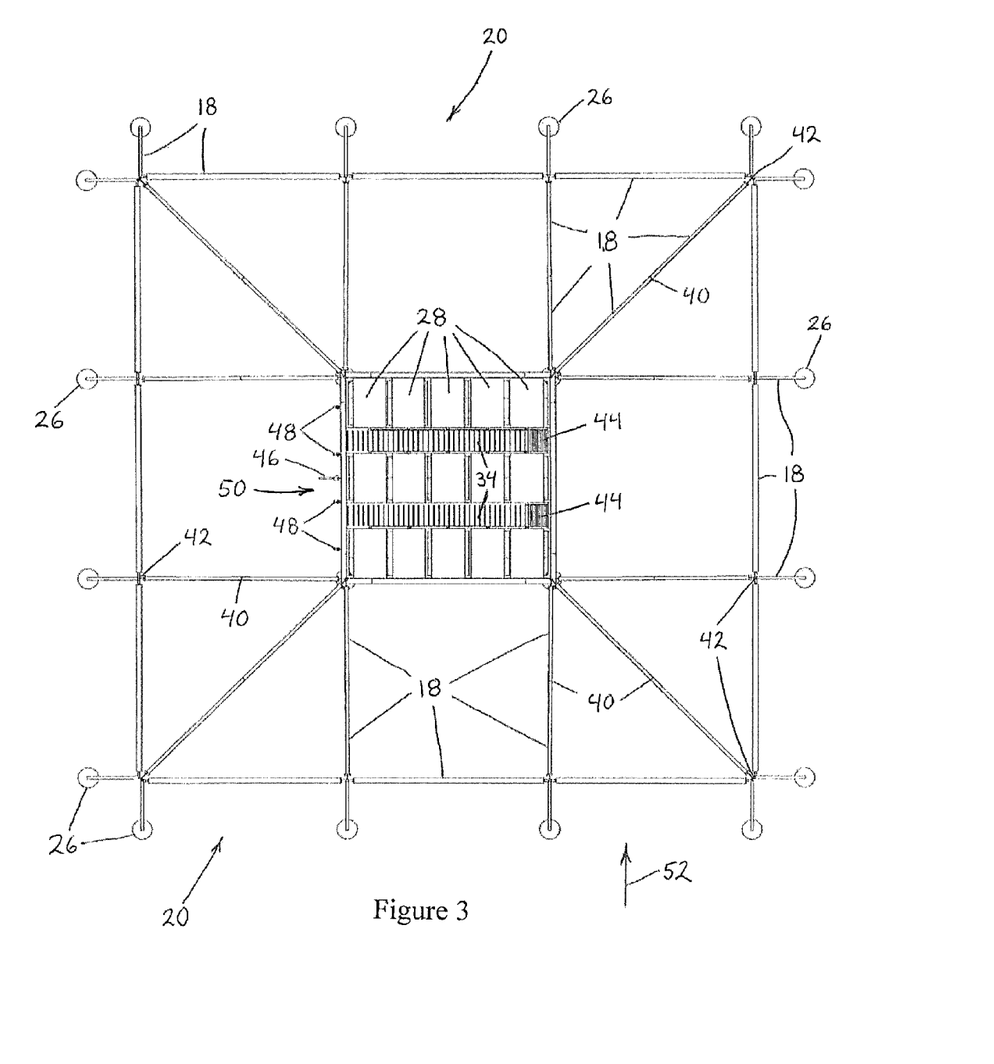
FIG. 3 is a top view of the overall support frame and certain other elements of the arrangement.

FIG. 1 provides a view from above an overall water collection, filtration, and distribution arrangement 10 according to the invention. The arrangement 10 illustrated includes a fabric exterior 16 preferably formed by a multiplicity of perforated polypropylene sheets or strips 12 joined together along reinforced fabric seams 14. For ease of illustration and explanation, the sheets or strips 12 are shown as transparent. Various support members 18 constituting part of an overall support frame 20, best shown in FIG. 3, are also visible through slits or openings 22 located between some adjacent pairs of the sheets 12. Fabric loops 24 may be formed at or added at or near the edges of the fabric exterior 16 in order to receive weights, such as metal rods, providing tension to the fabric exterior 16 to assure that the fabric remains taut. Weights or anchors (not shown) could also or alternatively be secured by cables to respective corners of the fabric exterior 16 and/or the frame 20 to help stabilize the water collection structure. The outer support members 18 visible in FIG. 1 include feet 26 at their lower ends for stability. A protective chain link enclosure may be utilized to deter unauthorized access to the arrangement.

An array of photovoltaic (solar) cells 28 may be disposed on an appropriate frame, including support members 30, over a central opening 32 in the fabric exterior 16. Access panels 34 located between adjacent rows of the solar cells 28 cover the requisite cable trays and cables. Certain portions of cable connections or the cables 36 themselves could remain exposed and may be seen in FIG. 1.

Figure 2:
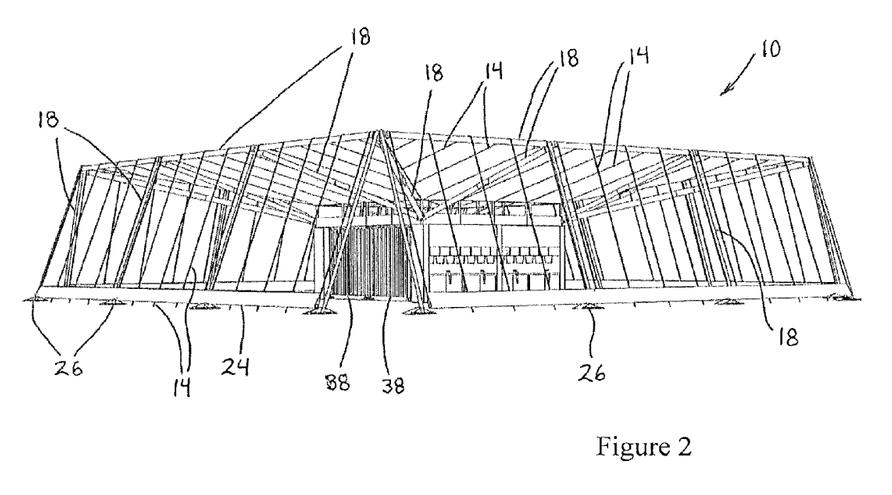
FIG. 2 is a ground level view of the overall water collection, filtration, and distribution arrangement shown in FIG. 1.

FIG. 2 provides a ground level view of the overall water collection, filtration, and distribution arrangement 10 shown in FIG. 1. Although the seams 14 are visible, again, in the particular illustration supplied, the sheets or strips 12 are transparent and, therefore, do not appear in the view provided by FIG. 2. FIG. 2, overall, shows one manner in which the support members 18 may be collectively joined together to form the support frame 20. The fabric loops 24 are illustrated in FIG. 2. As in FIG. 1, the outer support members 18 shown in FIG. 2 include feet 26 at their lower ends. FIG. 2 also shows central water retention containers 38 to which water is fed by way of the fabric exterior 16, which forms a lightweight water collection system or hood mounted on or connected to the containers in a manner to be described. By way of example, each of the containers 38 may be produced from a standard, readily available 20' ISO (International Organization for Standardization) shipping container.

The top view of the overall support frame 20 provided by FIG. 3 further illustrates the manner in which the members 18 may be collectively joined together to form the support frame. Linear joints 40 and corner joints 42, all conventional in nature, may be used for this purpose. Feet 26, solar cells 28, and access panels 34 are also evident in FIG. 3, as are ladders 44, permitting manual inspection and servicing of the solar cells and their cables. The switch or handle 46 of a pump and trickle feed nozzles 48, forming elements of a filtration system 50 used to discharge collected water stored in the containers 38, are additionally visible in FIG. 3.

Figure 4:
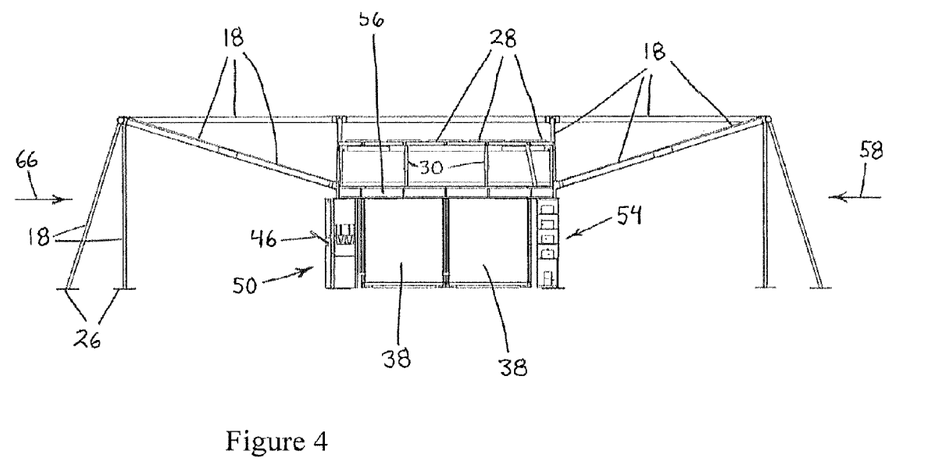
FIG. 4 is a side elevation view of the arrangement.

As seen in the direction identified by the arrow 52 in FIG. 3, with the fabric exterior 16 entirely removed, the overall water collection, filtration, and distribution arrangement 10 would appear as shown in the elevation view provided by FIG. 4. The support members 30 for the solar cell array, the containers 38, the pump switch or handle 46, the filtration system 50, and various support members 18 and feet 26 are indicated in FIG. 4. Also shown in FIG. 4 is a battery storage unit 54 for storing energy generated by way of current produced by the solar cells 28. If it is desired to omit the solar cells 28 for some reason, the battery storage unit 54 might be unnecessary, and a second filtration system to discharge collected water stored in the containers could be provided in place of the battery storage unit 54.

It is contemplated that the containers 38, as supplied, will have open tops. Referring once again to FIG. 1, in the particular arrangement illustrated, the fabric exterior 16 defines four inclined, roughly trapezoidal surfaces surrounding the central opening 32. By way of these inclined, roughly trapezoidal surfaces, rain landing on the trapezoidal surfaces of the fabric exterior 16 will be fed to the central opening 32. The support members 30 assure that the array of solar cells 28 is kept above the opening 32. The fabric exterior 16 thus defines a lightweight water collection system or hood mounted on, connected to, or otherwise associated with the containers 38. In the particular configuration shown in FIGS. 1 and 4, the collection system or hood conducts water toward and discharges water onto a multi-layer water catchment arrangement 56 (FIG. 4) disposed over the open tops of the containers 38. In its preferred configuration, the water catchment arrangement 56 pre-filters the captured rainwater as it is fed into the containers. The arrangement 56 could, for example, include a fiberglass grating or frame for support as an inner layer, an outer perforated polypropylene tile layer providing coarse filtering, and at least one intermediate layer of mosquito netting or similar material for relatively fine filtering. A more detailed discussion of the water catchment arrangement 56 is supplied in connection with FIG. 9.

Figure 5:
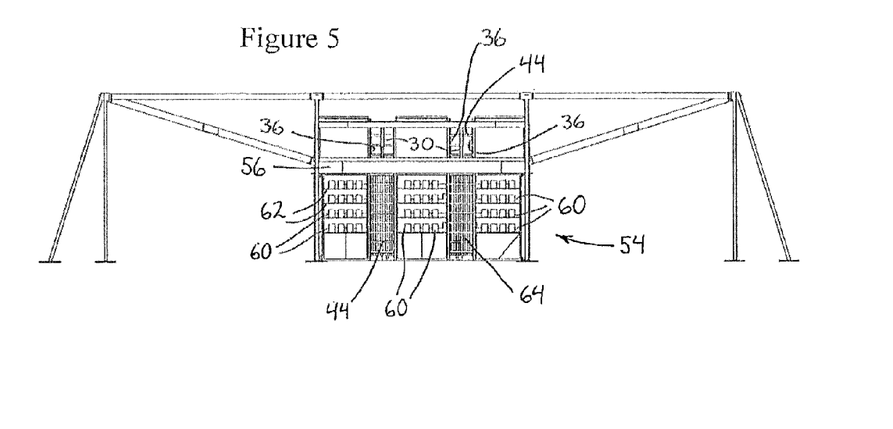
FIG. 5 is a view of the arrangement shown in FIG. 4 in one lateral direction.

FIG. 5 is a view of the arrangement as shown in FIG. 4 in the direction indicated by an arrow 58. In the particular arrangement illustrated in FIG. 5, three arrays of batteries 60 are supported by shelving 62 in the battery storage unit 54. Frame support members 30, cables 36, ladders 44, the water catchment arrangement 56, and parts of the corrugated exterior surfaces 64 of the containers 38 are also visible in FIG. 5.

Figure 6:
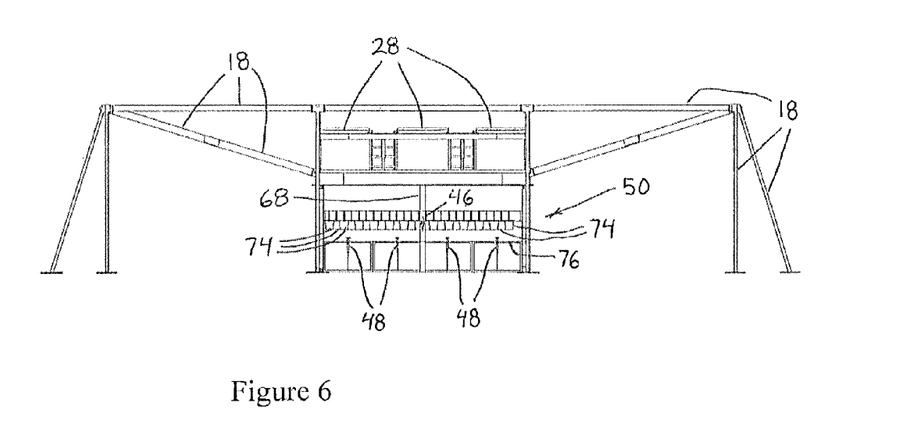
FIG. 6 is a view of the arrangement similar to FIG. 5 but in the opposite lateral direction.

FIG. 6 is an elevation view of an opposite side of the arrangement in the direction indicated by an arrow 66 in FIG. 4, and provides an overall illustration of the filtration system 50 used to discharge collected water stored in the containers 38. In addition to the various support members 18, the solar cells 28, the pump switch or handle 46, and the trickle feed nozzles 48 of the filtration system 50 identified, FIG. 6 illustrates a conduit 68, in which the pump having the pump switch or handle 46 is disposed, and a bank of ceramic pot filters 74, serving to provide fine filtering of water displaced from the containers 38.

The pump referred to could be either electrically or manually operated. The conduit 68 communicates, by way of a line or lines 80 (FIG. 8) tapped into the containers 38, with the bottoms of the container volumes. Actuation of the pump by way of the switch or handle 46 causes water to be withdrawn from the bottoms of the containers 38 and forced upward in the conduit 68. The water is then discharged from the conduit 68, e.g. by way of a line 82, into at least on header tank. In the particular embodiment illustrated, a plurality of header tanks 70 (FIGS. 7-8) that are in fluid communication by way of orifices 72 (FIG. 8) are provided. Orifices 72 could be plugged, by cork or in any other appropriate manner, if the need arises to clean any of the header tanks 70. If electrically operated, the pump can be configured to run, after selective actuation of the switch or handle 46, on power supplied by the arrays of batteries 60. By way of piping to be described, water from the header tanks 70 is supplied to an array of the ceramic pot filters 74 included as part of the filtration system 50. After passing through the filters 74, filtered water passes into a large receiving tank 76. Suitable operation of valves 78 disposed in receiving tank tap lines permits fully filtered water to be discharged for use by way of the trickle feed nozzles 48. Collection dishes (not shown) may be used to collect excess water passing through the nozzles 48 for recycling.

Figure 7:
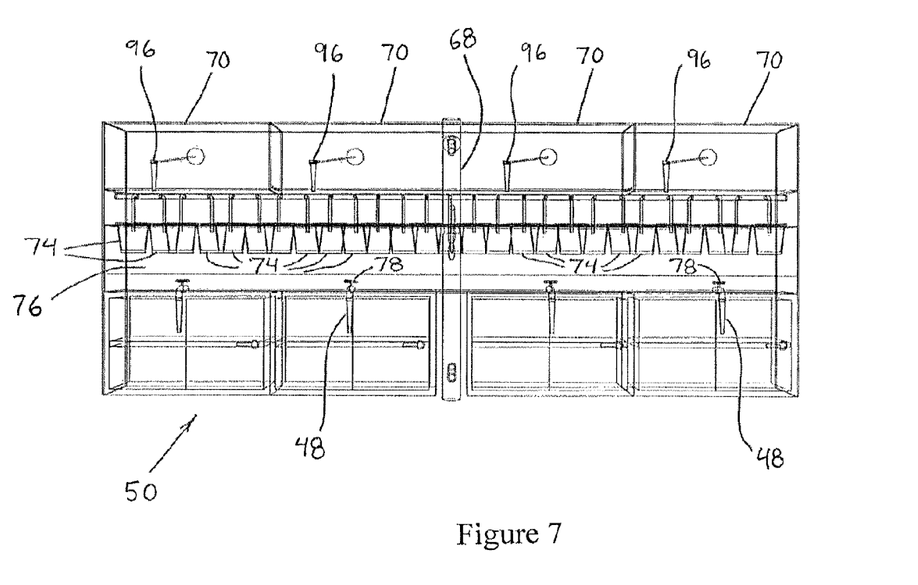
FIG. 7 is an enlarged view of a filtration system illustrated in FIG. 6.
Figure 8:
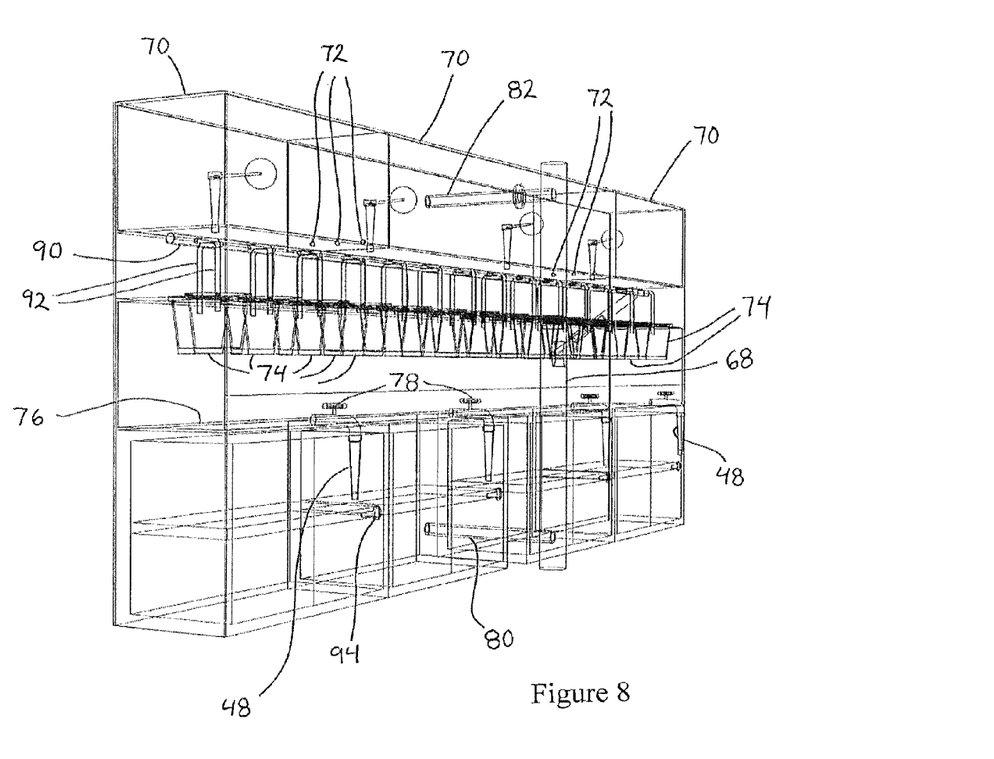
FIG. 8 is a perspective view schematically illustrating internal elements of the filtration system.

In addition to the trickle feed nozzles 48, the header tanks 70, the ceramic pot filters 74, the receiving tank 76, the valves 78 disposed in receiving tank tap lines, and other elements of the filtration system 50, FIGS. 7 and 8 show the piping used to distribute water received from the header tanks 70 to the array of ceramic pot filters 74. As best seen in FIG. 8, this piping includes a header pipe 90, in fluid communication with the header tanks 70, and a plurality of lead pipes 92 branching off from the header pipe 90. Each lead pipe 92 discharges water supplied by way of the header tanks 70 and the header pipe 90 into one of the filters 74. Again, after passing through the filters 74, filtered water passes into the large receiving tank 76. Float valves 96 may be operationally interconnected with the pump in the conduit 68 to assure that a desired level of pre-filtered water is maintained in the header tanks 70.

Replacement parts, servicing tools, and other equipment may be stored in compartments defined underneath the receiving tank 76 that are closed off by doors with door handles 94.

Figure 9:
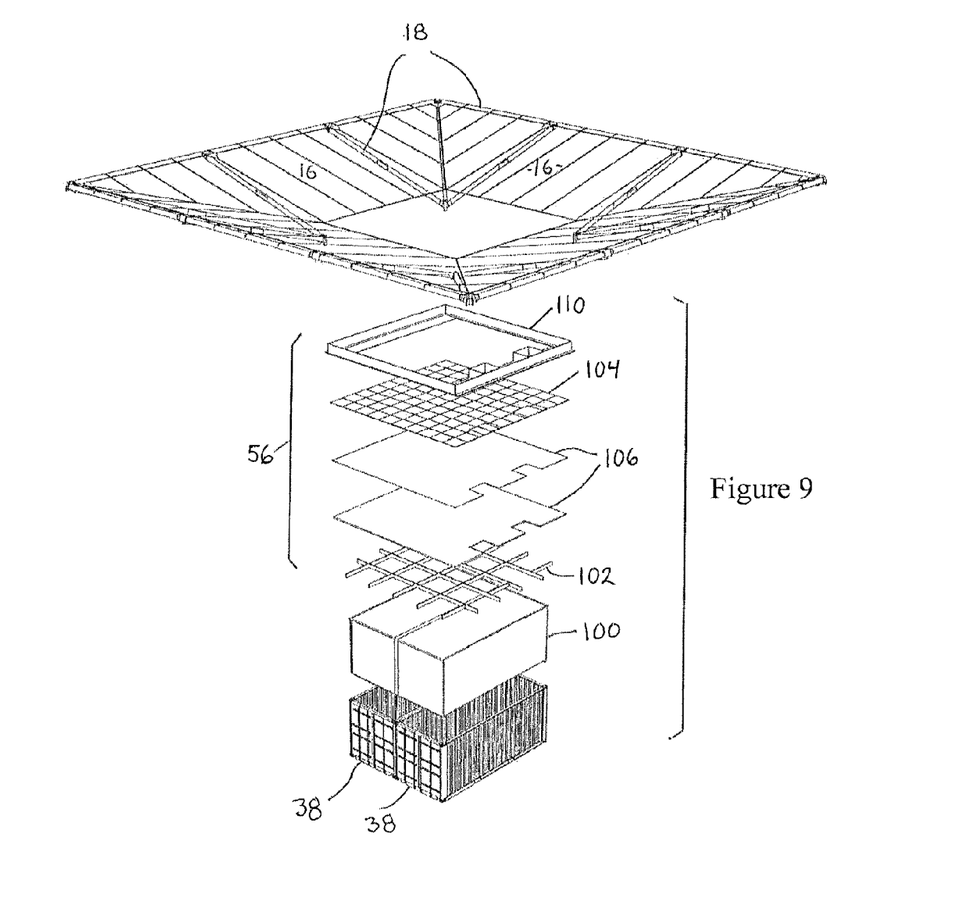
FIG. 9 is an exploded view showing components of a water catchment arrangement used in accordance with the invention.

FIG. 9 is an exploded view showing part of the fabric exterior 16 with certain support members 18, the containers 38, and components of the water catchment arrangement 56 referred to above. FIG. 9 additionally illustrates bladders or linings 100 that, optionally, could be used in conjunction with the containers 38 to assist in waterproofing. As illustrated in FIG. 9, the arrangement 56 includes a fiberglass grating or frame 102 for support as an inner layer, an outer perforated thermoplastic polymer tile layer 104, of propylene, for example, providing coarse filtering, and a pair of intermediate layers 106 of mosquito netting or similar material for relatively fine filtering. A central frame element 110 of adequate strength supports ends of the members 18 and can be used to cover external edges of the layers 102, 104, and 106 in an aesthetically pleasing manner.

A community could include one or more individual water harvesting systems such as that described. It is further envisioned that various harvesting systems could be interconnected by paths, trails, and roads, with each of the various harvesting systems serving a different purpose. Each individual water harvesting system, for example, could supply a residential area for one or more individuals. Individual water harvesting systems could be positioned in proximity or adjacent to areas of activity where individuals reside or otherwise engage in activities such as agriculture. As described above, an individual water harvesting system may receive rainwater, and consequently, individuals could construct residences in proximity to the system because of the increased likelihood that they will have access to water. As a community grows, additional individual water harvesting systems may be mounted or placed adjacent to the initial system, and optionally connected by piping, so that one or more water sources for the community can be fed together from all of the individual water harvesting systems.

The lightweight collection system formed, inter alia, by the fabric exterior 16 generally increases the surface area of water capture relative to that of the retention container only. The lightweight collection system is designed to be inexpensive, portable, demountable from the container or assembly, and easily assembled, and to protect the water captured from mosquitoes and other contaminants. Because of the simplicity of the collection system, once it is used at a location, it can be easily replicated using local materials, such as bamboo or wood, by local workers. Such replication can become a cottage industry at the location of collection system use or elsewhere.

The water retention container can be of any scale. The container, for example, could be a large shipping container as mentioned, or a locally fabricated container made of ceramic, clay, metal, mud, plastic, or other structural material, such as wood or bamboo. The container also could be of a smaller scale, such as a barrel or the like. The function of the container is to provide a structure to hold the captured rain water away from contaminants, such as ground-based parasites and pollutants. The container can be used as is, or can be fitted with a water bladder or lining, such as those shown in FIG. 9, that would fit within the container and be supported by the container but actually be in contact with the water. Large shipping containers are commonly dumped in areas such as sub-Saharan Africa, in which there is a need for water harvesting, and these containers exceptionally appropriate for use in connection with the invention.

The lightweight water collection system could include a frame and canvas or other flexible material, such as textile or sheet material. The opening provided by the collection system should be generally horizontal and parallel with the ground, and should be covered with a water permeable cover that serves to allow the water to pass into the collection system and water retention container but restricts the entry of dirt, mosquitoes, and other undesirable matter.

Multiple collection systems may be connected, for example by piping, to one or more retention containers. There can be a single collection system mounted directly to a single retention container. The retention container can be above ground, below ground, or otherwise positioned.

Advantageously, during dry seasons, the collection system can be demounted from the container and used as a habitable shade structure.

It is conceivable that the shipping containers could be replaced or supplemented with a gravel, sand, and/or clay substrate in a large cavity in the ground to hold the water harvested. The gravel, in turn, could be replaced by or supplemented with selected waste materials that provide support for the surface on top of the cavity and that are coplanar with the surrounding ground. This water likely would be suitable for irrigation purposes if the waste materials are properly selected to be generally clean.

The water collected could be used to support irrigation of the surrounding land, agricultural resources, and, potentially, industries sustained based on the water supply supported by the water harvesting system.

The continuously supplied clay water filtration bank of the invention operates to maintain an almost constant pressure so that the speed of filtration through the pots can be maximized. It is expected that the filtration speed through an individual pot will increase from the standard 30 liters per day rate to 48 liters per day, and, potentially, up to as much as 80 liters a day or more. The filtration bank can contain as many pots as can be assembled or supplied; filtration banks with 25 modules and 100 modules have been designed. These modules can expand in number essentially without limit, and may assume a number of configurations. By way of example, a 25 module bank can filter between 1200 and 2000 liters per day or more, and can potentially serve 60-100 people, year round, in much of the developing world.

Filter banks, of course, can be linked to the rainwater harvesting structures described or used independently as filters for ground water supplies.

In less-developed parts of the world, perhaps a billion people do not have access to clean water and are without an acceptable water supply. in rural Africa, women often walk ten miles or more every day to fetch water. In the dry season it is not uncommon for women to walk twice this distance, only to arrive at water sources that are dirty, polluted, and constitute health hazards. Every year, there are 1.7 million deaths, mainly children under the age of five, due to diarrhea caused by unsafe water. People in developing portions of the world urgently need reliable access to good quality water in adequate quantities, with inexpensive water filtration technology, and with robust local distribution systems.

The present invention aims to improve water access and quality and to sustainably reduce "water poverty" as a result. Access to safe, affordable drinking water through (1) improved effectiveness of existing point-of-use CWF technology to filter viruses, arsenic, and fluoride, (2) appropriately scaled CWF systems utilizing modular water filtration units developed as described and suitable in scale for institutional, community, or municipal use, and (3) effectively linking modular water filtration units to rainwater harvesting supplies can be provided by the invention.

Increases in the availability, capacity, and effectiveness of items utilizing CWF technology, which items can be locally manufactured, for individuals, communities and municipalities are also provided in several ways. CWF vessels may be grouped in linear and non-linear configurations, scaled through development of design and assembly principles for modular units that can include from two to perhaps 1000 modules to increase daily supply volumes, and used in combination with rainwater harvesting and storage systems to demonstrate the social benefits, economic viability, and ecological sustainability of localized, non-linear water infrastructures.

A simple set of principles and design parameters can be used for scaling individual CWF units into larger collections of two to many hundreds of units, enabling filtration and distribution of large quantities of water (up to 30,000 liters per day). The system is thus made suitable for institutional and municipal uses as well as domestic uses.

While one particular form of the invention has been illustrated and described, it will be apparent that various modifications and combinations of the invention detailed in the text and drawings can be made without departing from the spirit and scope of the invention. For example, references to materials of construction, methods of construction, specific dimensions, shapes, utilities or applications are also not intended to be limiting in any manner and other materials and dimensions could be substituted and remain within the spirit and scope of the invention. Accordingly, it is not intended that the invention be limited, except as by the appended claims.

The invention claimed is:

1. A filtration and dispensing system for storing, filtering, and dispensing rainwater, surface water, or groundwater, comprising:
    a bank of ceramic filters,
    a water retention container for holding water to be dispensed by the system,
    at least one header tank to which water supplied from the water retention container is fed,
    a pump by which water is withdrawn from a lower portion of the water retention container and supplied to the header tank,
    piping by which water is distributed from the header tank to individual ceramic filters in the bank of ceramic filters,
    a collection tank receiving filtered water discharged from the bank of ceramic filters, and
    feed elements for discharging the filtered water from the collection tank for use.

2. The filtration and dispensing system according to claim 1, further comprising a battery array for supplying power to the pump.

3. The filtration and dispensing system according to claim 2, further comprising a solar cell arrangement by which batteries in the battery array are charged.

4. The filtration and dispensing system according to claim 1, further comprising a catchment arrangement overlying an open top of the collection tank to pre-filter water entering the collection tank.

5. The filtration and dispensing system according to claim 4, wherein the catchment arrangement includes coarse filtering, fine filtering, and support layers.

6. The filtration and dispensing system according to claim 5, wherein the coarse filtering layer is a thermoplastic polymer layer.

7. The filtration and dispensing system according to claim 6, wherein the thermoplastic polymer is polypropylene.

8. The filtration and dispensing system according to claim 5, wherein the fine filtering layer is a layer of netting.

9. The filtration and dispensing system according to claim 8, wherein the netting is mosquito netting.

10. The filtration and dispensing system according to claim 5, wherein the support layer is a grating or frame.

11. A water collection, filtration, and distribution arrangement for collecting, storing, filtering, and dispensing rainwater, comprising:
   a portable fabric enclosure having a surface configured to direct water incident thereon toward a central opening therein,
   a bank of ceramic filters,
   a water retention container for holding water to be dispensed by the system,
   at least one header tank to which water supplied from the water retention container is fed,
   a pump by which water is withdrawn from a lower portion of the water retention container and supplied to the header tank,
   piping by which water is distributed from the header tank to individual ceramic filters in the bank of ceramic filters,
   a collection tank receiving filtered water discharged from the bank of ceramic filters, and
   feed elements for discharging the filtered water from the collection tank for use.

12. The water collection, filtration, and distribution arrangement according to claim 11, further comprising a battery array for supplying power to the pump.

13. The water collection, filtration, and distribution arrangement according to claim 12, further comprising a solar cell arrangement by which batteries in the battery array are charged.

14. The water collection, filtration, and distribution arrangement according to claim 11, further comprising a catchment arrangement overlying an open top of the collection tank to pre-filter water entering the collection tank.

15. The water collection, filtration, and distribution arrangement according to claim 14, wherein the catchment arrangement includes coarse filtering, fine filtering, and support layers.

16. The water collection, filtration, and distribution arrangement according to claim 15, wherein the coarse filtering layer is a thermoplastic polymer layer.

17. The water collection, filtration, and distribution arrangement according to claim 16, wherein the thermoplastic polymer is polypropylene.

18. The water collection, filtration, and distribution arrangement according to claim 15, wherein the fine filtering layer is a layer of netting.

19. The water collection, filtration, and distribution arrangement according to claim 18, wherein the netting is mosquito netting.

20. The water collection, filtration, and distribution arrangement according to claim 11, wherein the portable fabric enclosure includes support members that are detachable from one another.

* * * * *